United States Patent [19]

Savage et al.

[11] 4,201,665

[45] May 6, 1980

[54] USE OF NONSTOICHIOMETRIC CARBON-SULFUR COMPOUNDS TO REMOVE COMPONENTS FROM LIQUIDS

[75] Inventors: David W. Savage, Summit; Chin H. Chang, Edison; John M. Longo, New Providence, all of N.J.

[73] Assignee: Exxon Research & Engineering Co., Florham Park, N.J.

[21] Appl. No.: 866,267

[22] Filed: Jan. 3, 1978

[51] Int. Cl.² .......................................... B01D 15/06
[52] U.S. Cl. ................................... 210/32; 210/37 B; 210/38 B; 210/40
[58] Field of Search .................. 75/101 R; 208/251 R; 210/27, 30 R, 30 A, 36, 37 R, 37 B, 38 R, 38 A, 38 B, 38 C, 39, 40, 32; 252/414, 416–420, 428, 439, 443–445

[56] References Cited

U.S. PATENT DOCUMENTS

| | | | |
|---|---|---|---|
| 3,965,036 | 6/1976 | Himmelstein | 252/414 |
| 4,048,061 | 9/1977 | Blytas | 208/251 R |
| 4,053,396 | 10/1977 | Trense et al. | 210/40 |

OTHER PUBLICATIONS

B. R. Puri, "Surface Complexes on Carbons", Chapter in *Chemistry and Physics of Carbon*, vol. 6, Marcel Dekker, New York, 1970.
B. R. Puri, "Adsorption at Interfaces", *ACS Symposium Series*, vol. 8, pp. 212–224, 1975.
B. R. Puri et al., *Carbon*, vol. 11, pp. 329–336, Pergamon Press, Great Britain, 1973.
Puri et al., *Carbon*, vol. 9, pp. 123–134, Pergamon Press, Great Britain, 1971.
Blayden et al., *Carbon*, vol. 5, pp. 533–544, Pergamon Press, Great Britain, 1967.
Maruyama et al., *Journal Water Pollution Control Federation*, vol. 47, No. 5, pp. 962–975, May 1975.
Lawson et al., "Water—1973", *AICHE Symposium Series* 135, vol. 70, pp. 544–584, 1974.

*Primary Examiner*—Ivars C. Cintins
*Attorney, Agent, or Firm*—John W. Ditsler; Edward H. Mazer

[57] ABSTRACT

Nonstoichiometric carbon-sulfur compounds have been found to be effective adsorbents for removing a wide variety of organic and/or inorganic materials from liquids, preferably polar liquids. Removal of biorefractory organics, such as aromatics, is particularly effective using such compounds. The spent adsorbent may then be regenerated.

45 Claims, 10 Drawing Figures

USE OF NONSTOICHIOMETRIC CARBON-SULFUR COMPOUNDS TO REMOVE COMPONENTS FROM LIQUIDS

BACKGROUND OF THE INVENTION

1. Field of the Invention

In general, the present invention relates to a process for removing a wide variety of materials from liquids. More particularly, this invention relates to a process for removing organic and/or inorganic materials from aqueous and/or non-aqueous liquids by contact with non-stoichiometric carbon-sulfur compounds under adsorption conditions.

2. Description of the Prior Art

One method for removing organic and/or inorganic materials from liquids is by using activated carbon as an adsorbent. This method has found particular application in removing organic contaminants from municipal and/or industrial waste waters as well as from the effluents from secondary biological treating processes (see, for example, U.S. Pat. Nos. 3,244,621, 3,455,820, 3,658,697 and 4,053,396, the disclosures of which are incorporated herein by reference).

However, conventional activated carbons have been observed to have several limitations. For example, they show little amenity to adsorb many common, low molecular weight, polar organics found typically in petrochemical effluents (see C. T. Lawson and J. A. Fisher, "Water—1973", *AIChE Symposium Series* 135, Vol. 70, pp. 544–584, 1974, the disclosure of which is incorporated herein by reference). In addition, inorganic species, particularly toxic materials such as metal ions and cyanides, are adsorbed poorly on conventional carbons (see T. Maruyama, S. A. Hannah and J. M. Cohen, *Journal Water Pollution Control Federation*, Vol. 47, No. 5, pp. 962–975, the disclosure of which is incorporated herein by reference). Further, desorption of certain aromatics (e.g., alkylbenzenes, nitro-aromatics, and the like) from conventional activated carbon is difficult due to the high binding energy of said aromatics on the carbon (see B. R. Puri, "Surface Complexes on Carbons", Chapter in *Chemistry and Physics of Carbon*, Vol. 6, Marcel Dekker, 1970; B. R. Puri, "Adsorption at Interfaces", *ACS Symposium Series*, Vol. 8, pp. 212–224, 1975; B. R. Puri et al, *Carbon*, Vol. 11, pp. 329–336, 1973, the disclosures of which are incorporated herein by reference). As such, regeneration of the spent activated carbon adsorbent becomes expensive in that high temperatures (e.g., 900°–1000° C.) and long contact times are required. The high temperatures result in destruction of the adsorbate as well as loss of carbon by attrition and burn-off. As such, carbon makeup costs become excessive.

Therefore, in view of the inadequacies of conventional activated carbon adsorbents, there is a need for an inexpensive adsorbent which can remove materials from aqueous and/or non-aqueous liquids effectively without the difficulties mentioned previously.

SUMMARY OF THE INVENTION

Now, according to the present invention, it has been unexpectedly discovered that organic and/or inorganic components can be removed from aqueous and/or non-aqueous liquids by contact with an adsorbent comprising nonstoichiometric carbon-sulfur compounds (abbreviated hereinafter as $C_xS$). Use of $C_xS$ as an adsorbent has the advantages of easier desorption of certain materials (e.g. aromatics), low $C_xS$ loss and easier recovery of adsorbate relative to conventional activated carbons. Also $C_xS$ is easily and inexpensively prepared. Spent $C_xS$ adsorbent may be regenerated thermally, by solvent extraction or by vapor stripping.

DETAILED DESCRIPTION OF THE INVENTION

According to the present invention, organic materials, inorganic materials, or mixtures thereof may be removed from aqueous liquids, non-aqueous liquids, or mixtures thereof by contact with nonstoichiometric carbon-sulfur compounds of the formula $C_xS$. Such compounds may be prepared by a variety of techniques including reacting a carbonaceous material at elevated temperatures (e.g., between say 400° and 700° C.) with a sulfur-containing gas such as $H_2S$, $SO_2$, $S$ and the like (see H. E. Blayden and J. W. Patrick, *Carbon*, Vol. 5, pp. 533–544, Pergamon Press Ltd., Great Britain, 1967; and B. R. Puri and R. S. Hazra, *Carbon*, Vol. 9, pp. 123–134, Pergamon Press, Great Britain, 1971, the disclosures of which are incorporated herein by reference). Suitable carbonaceous materials from which $C_xS$ may be prepared include coal chars, conventional activated carbons, petroleum fluid coke, sucrose char, various polymeric chars (e.g., polyvinylidene difluoride char) and the like. The value of x is not critical and may range broadly, e.g., from about 50 to about 4, which corresponds to from about 5 to about 40 wt % sulfur. Preferably x will range between about 10 and about 4, which corresponds to from about 20 to about 40 wt. % sulfur. Also, x need not be an integer. $C_xS$ may be characterized as a surface compound of carbon with variable composition and no crystallinity. $C_xS$ is very stable (the sulfur being chemically bound) and is inert to acid, base and organic solvents—an exception being highly concentrated nitric acid.

The particular $C_xS$ compounds employed as an adsorbent in the present invention may be in either powder or granular form and should have a surface area of at least 300, preferably at least 500, square meters per gram as measured by the Brunauer-Emmett-Teller equation for physical adsorption of nitrogen (i.e., the BET test). Normally the surface area will range between about 300 and about 2500, preferably between about 500 and about 1400, square meters per gram. The carbonaceous adsorbent should have a pore volume of at least 0.2, preferably at least 0.5, and more preferably at least 1.0, cubic centimeters per gram. Typically, the pore volume will range from about 0.3 to about 1.2 cubic centimeters per gram. The particle size of the carbonaceous adsorbent is also not critical and may range broadly. In general, the particle size will range from about 5 microns to about 1 centimeter. Preferably, it will range from about 325 (45 microns) to about 24 (710 microns), more preferably from about 150 (105 microns) to about 48 (300 microns) Tyler screen mesh.

Aqueous liquids, non-aqueous liquids or mixtures thereof can be suitably treated according to the present invention. Examples of non-aqueous liquids include alcohols, olefinic hydrocarbons, paraffinic hydrocarbons, silicones, halogenated hydrocarbons, sulfones, pyridines, liquid metals and the like. It is preferred that the liquid be polar. Examples of suitable polar liquids include water, alcohols, esters, organic and inorganic acids, ketones and the like. This virtually any liquid from which dissolved materials can be adsorbed can be treated according to the present invention.

The liquids to be treated can be obtained from practically any source including but not limited to petroleum refineries, petrochemical plants, coal gasification and coal liquefaction plants, paper mills, food prooocessing plants, or miscellaneous manufacturing and industrial plants. The liquid may be a product, by-product or waste stream from such facilities. Also, organic and/or inorganic materials can be removed from natural bodies of water (such as lakes, rivers, etc.). Thus, the source of the liquid to be treated is essentially immaterial.

Virtually, any dissolved organic and/or inorganic material may be removed from a liquid according to the present invention. Organic components subject to removal include, but are note limited to, aromatic compounds, aliphatic compounds, phenolic compounds, organic acids, alcohols, esters, aldehydes, amines, pyridines, morpholines, esters, glycols, glycol ethers, halogenated hydrocarbons, ketones, oxides, vinyl chloride and the like. Removal of bioresistant organics such as aromatic hydrocarbons, halogenated hydrocarbons, nitrated hydrocarbons, and the like is particularly effective using the present invention. Inorganic components that can be suitably removed include, but are not limited to, metal and metalloid ions, cyanides, thiocyanates and the like. Metallic and metalloid ions that can be removed using $C_xS$ include $Cu^{++}$, $Ag^+$, $Au^{+++}$, $Hg^{++}$, $Pb^{++}$, $Mn^{++}$, $Ni^{++}$, $Cd^{++}$, $Ba^{++}$, $Cr(VI)$, $Zn^{++}$, $Fe^{+++}$, $Al^{+++}$, $V(V)$, $UO_2^{++}$ and the like. While the present invention is particularly useful for removing dissolved materials from the liquid, the $C_xS$ adsorbent will also filter suspended materials therefrom.

The amount of organic and/or inorganic materials present in the liquid is not critical to the practice of the present invention and may range broadly, depending upon various process and economic factors such as the amount of $C_xS$ employed, the degree of purification desired, the frequency of $C_xS$ regeneration, size of contacting zone, and the like. Thus, liquids containing dilute (or concentrated) amounts or organic and/or inorganic materials can be suitably treated according to the present invention. Broadly speaking, the amount of such materials in the liquid can range from say, about 5 wppb to about 25 wt. % based on total weight of the liquid.

The temperatures and pressures employed during the practice of the present invention are also not critical and can vary broadly, depending upon various economic and process factors; particularly, the physical properties of the liquid being treated. However, it is important that the temperature and pressure be such that said liquid will be maintained substantially in the liquid phase. Thus, the temperature should be maintained above the freezing point and below the boiling point of the particular liquid at the pressure employed. This could include very low temperatures such as are normally associated with cryogenic operations (for say the removal of materials from a liquefied gas) as well as elevated temperatures such as might be required for liquids having high boiling points. While the pressure can also range broadly (say from 0 to about 1000 psia or more), the pressure will normally range from 0 to about 500 psia.

Similarly, the residence or contact time of the liquid with the $C_xS$ adsorbent is not critical and can also range broadly, depending on such factors as the amount of impurities present, the degree of removal desired and the like. While the residence time need be only that sufficient to effect removal of at least a portion of said organic and/or inorganic materials from the liquid, the residence time could vary up to say ten hours or more. Typically, however, the residence time will be less than five hours and, preferably, in the range of about 1 minute to 2 hours.

Figure 1A:
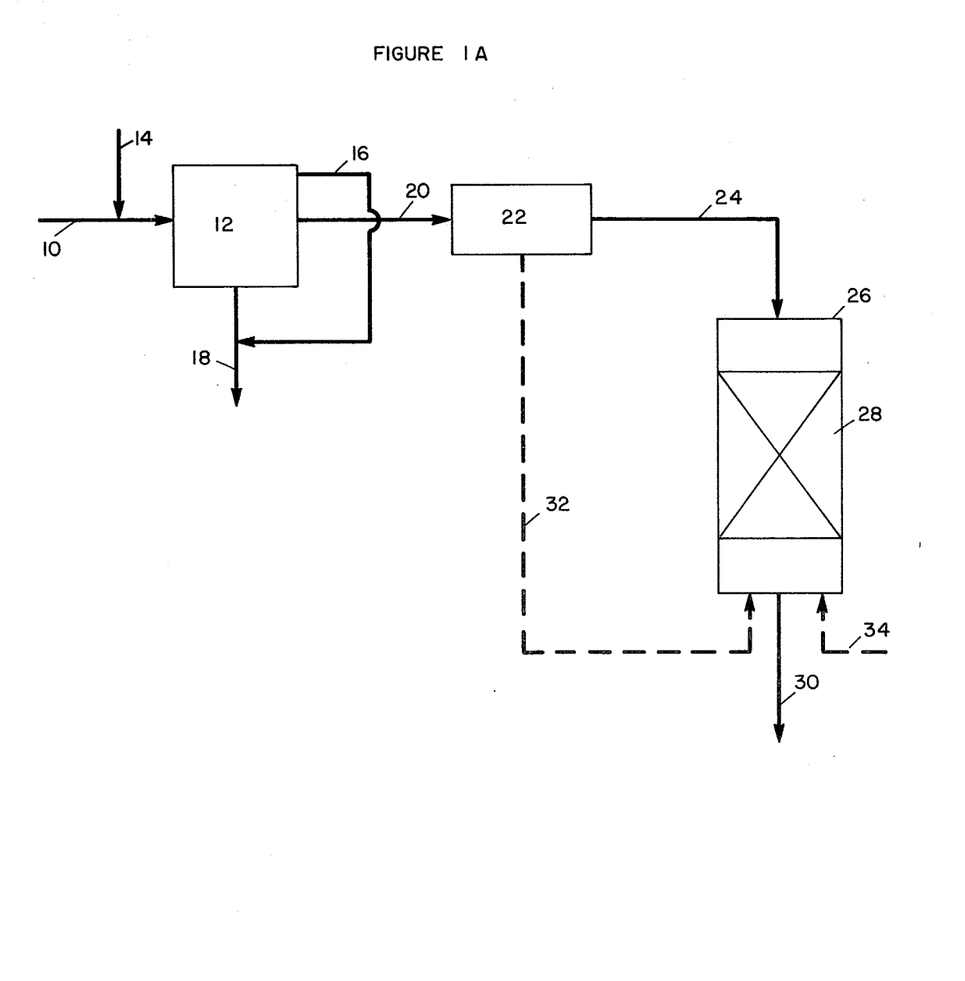
FIG. 1A shows a flow diagram of one embodiment of the present invention wherein waste water contacts a bed of $C_xS$.
Figure 1B:
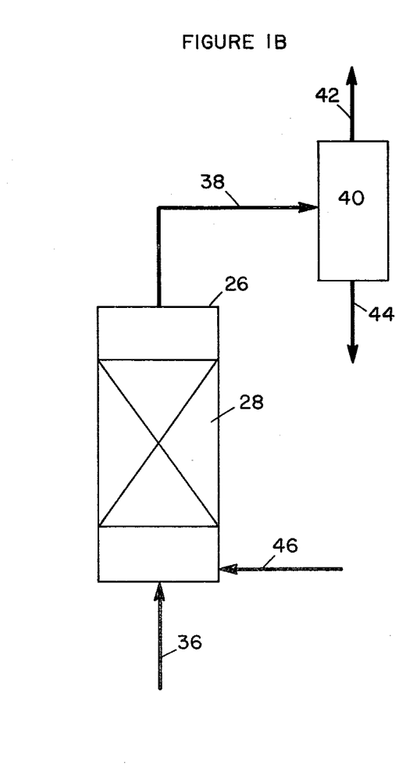
FIG. 1B shows a flow diagram for regenerating spent $C_xS$ adsorbent.
Figure 2:
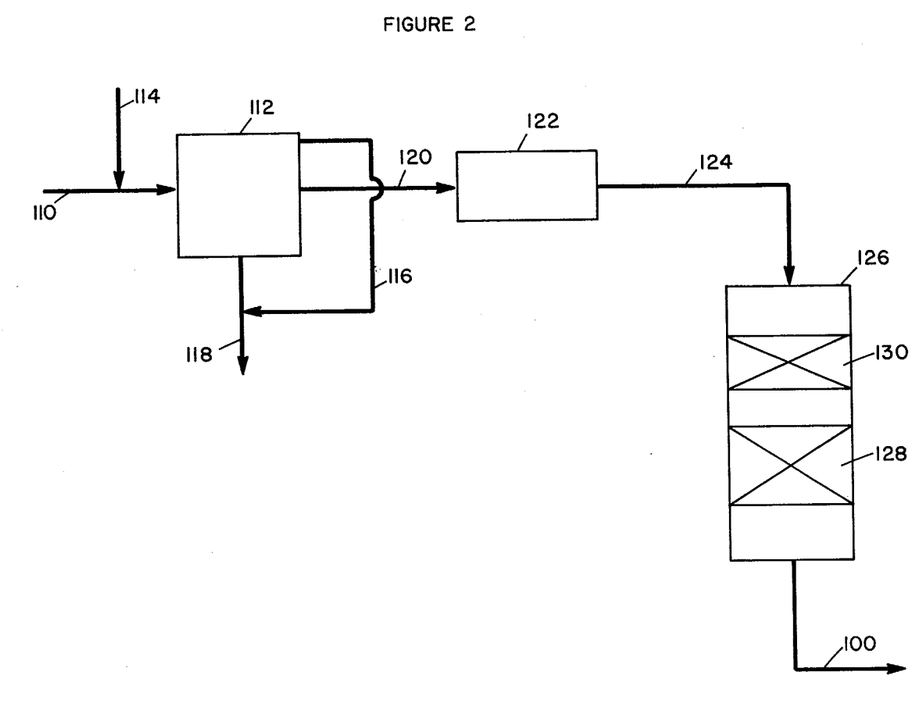
FIG. 2 shows a flow diagram of another embodiment of the present invention wherein waste water contacts a bed of $C_xS$ prior to contacting a bed of conventional activated carbon.

Having thus described the invention in general terms, reference is now made to FIGS. 1 and 2 which show two embodiments of the present invention as applied to waste water treating processes. It is to be understood that FIGS. 1 and 2 are shown only in such details as are necessary for a clear understanding of how the present invention may be applied to adsorb materials from waste water. No intention is made to unduly limit the scope of the present invention to merely waste water treating as variations obvious to those having ordinary skill in the art of adsorption processes are included within the broad scope of the present invention.

Referring now to FIG. 1, raw waste water from municipal sources, industrial sources or mixtures thereof is clarified initially by passage via line 10 into pretreatment zone 12. Impurities which may be present in such waste waters include, but are not limited to, inorganic materials, suspended oil, suspended solid materials, phenolic compounds, aromatic compounds, aliphatic compounds, organic acids, alcohols, esters, or other mixtures such as may occur in the waste waters of petroleum refineries, petro-chemical plants, or miscellaneous manufacturing or industrial plants. The present invention is particularly applicable to removing dissolved bioresistant contaminants such as aromatics, halogenated and nitrated hydrocarbons and the like, which are characteristic of petroleum refining and organic chemical manufacturing waste waters. In general these bioresistant contaminants are toxic and contribute very objectionable taste, odor and oxygen demand to the receiving waters and are essentially removed by adsorption on the $C_xS$.

In pretreatment zone 12, the waste water is subjected to gross removal of the suspended impurities (e.g., oil and other suspended solids) present therein. Preferably, material which does not pass an 0.45 micron Millipore filter is removed to a concentration of less than 25 weight parts per million, more preferably less than 15 weight parts per million. The pretreatment processes which may be employed can vary over a wide range and include, but are not limited to, the following: dissolved air flotation, sedimentation, solids-contact clarification, and granular media filtration. The preferred pretreatment process for reducing suspended material to less than 15 weight parts per million comprises granular media filtration—for example, dual-media filtration. If desired, a coagulant can be added to the raw waste water via line 14 to aid in the removal of the suspended materials. Suitable coagulants include alum, lime, activated clay as is disclosed in U.S. Pat. No. 3,487,928 (the disclosure of which is incorporated herein by reference), polyacrylonitrile, sulfonated polystyrene, and the like. Should a coagulant be needed, activated clay is preferred. Typically, 1 to 50 wppm, preferably 1 to 30 wppm, of the coagulant agent is added to the raw waste water.

Typically, the raw waste water is allowed to remain in zone 12 for 30 to 90 minutes in order to permit the suspended solids to settle. Floatable oil and other insoluble materials are removed from the top of the primary separator by conventional means, such as a rotating skimming device, and withdrawn via line 16. Sludge, which is composed of solid particles in the waste water such as salt, fibers, tar and the like, settles to the bottom of the primary separation zone 12 and is removed via line 18. Generally, ambient conditions of temperature and pressure are employed in zone 12.

The pretreated waste water (from which a major portion of the suspended solids have been removed) is then passed via line 20 into a storage tank 22 in order to provide feed equilization for the $C_xS$ adsorption beds and backwash water for said beds. Thereafter, the pretreated waste water is passed via line 24 into the upper portion of contacting zone 26 which contains a bed of $C_xS$ shown as 28. Although this particular embodiment shows the presence of only one bed, it should be clearly understood that one or more beds of $C_xS$ may be employed in zone 26. The waste water then passes downward through contacting zone 26—typically at a rate of from about 2 to about 10 gpm/sq. ft., preferably from about 4 to about 8 gpm/sq. ft.—and comes into contact with progressively less exhausted $C_xS$. Organic and/or inorganic materials dissolved in the waste water are then adsorbed by the $C_xS$. Accordingly, an effluent stream of water having a reduced amount of organic and/or inorganic materials (i.e., contaminants) is withdrawn and/or recovered from zone 26 via line 30. Preferably, a major portion of said materials is removed from the waste water. Most preferably, the effluent is substantially depleted in dissolved contaminants. By substantially depleted is meant that at least 80%, preferably at least 90%, and more preferably at least 95% of the dissolved contaminants present in the waste water entering contacting zone 26 are removed therefrom. If desired, the waste water may be passed upflow rather than downflow.

Although the raw waste water stream is pretreated to remove suspended solids and oils therefrom, some suspended materials may still be present in the water entering zone 26. Since the bed of $C_xS$ compounds will effectively filter the remaining suspended solids from the waste water, it may be necessary to backwash the $C_xS$ bed periodically. Backwashing is required whenever the solids buildup causes either an increase in the pressure drop when the waste water is passed downflow through the bed of $C_xS$ or whenever there occurs an excessive bed expansion when waste water is passed upflow through the bed of $C_xS$. As shown in FIG. 1A, backwashing is accomplished by pumping pretreated effluent via dashed line 32 into zone 26 and up through bed 28 at a rate of from about 10 to about 20 gallons per minute per square foot. If desired, treated effluent in line 30 could be used as backwash water rather than effluent from zone 22. It is preferred to interrupt intermittently the passage of this pretreated effluent by passing via dashed line 34 upwardly through the $C_xS$ bed a gaseous stream containing oxygen, such as air, in order to scour the $C_xS$ granules and help reduce the thickness of the solids buildup thereon. This procedure can be employed when needed. However, typically, the $C_xS$ bed will be backwashed about every 2-4 days, with the period of time required for the backwashing ranging from about $\frac{1}{2}$ to 1 hour. Normally, the backwashing will be interrupted approximately three or four times in order to air scour the $C_xS$ by passing air, preferably under pressure, for a period of from about 10 to about 30 seconds, upwardly through the bed.

As noted above, the temperature within contacting zone 26 is not critical and will vary with a variety of process and economic factors. In the case of water, the temperature will normally range from about 40° to about 200° F., preferably from about 50° to 150° F. Likewise, the pressure is not a critical variable and, for water, will normally range from about 0 to about 200 psig. The residence time of the waste water in the contacting zone will normally range from about 1 to about 60 minutes.

During contact with the $C_xS$ adsorbent, the waste water becomes depleted in dissolved organic and/or inorganic contaminants (as well as the remaining suspended oils and solids, etc.) by adsorption on the $C_xS$ such that the $C_xS$ becomes spent (i.e. at least a portion, typically a major portion of its adsorptive capacity becomes exhausted) and must be regenerated for further use. However, the particular point at which the $C_xS$ is considered to be spent depends not only on its ability (i.e. capacity) to remove contaminants, but also on economic considerations. For example, it may be desirable to regenerate $C_xS$ whose adsorptive capacity is only mildly reduced to essentially fresh adsorptive capacity rather than allow its adsorptive capacity to be reduced to a much lower level and then be regenerated to fresh or less than fresh adsorptive capacity. Therefore, as used herein, the terms "regeneration" or "regenerated" mean recovering $C_xS$ that possesses greater capacity to adsorb organic and/or inorganic contaminants than that possessed by the $C_xS$ removed from the waste water treatment process. It should be understood that the following discussion relating to removing contaminants or impurities present in waste water from the adsorbent is only illustrative, as the particular regeneration techniques described herein are equally applicable to removing broad classes of organic and/or inorganic materials.

While the $C_xS$ may be regenerated ex situ, in situ regeneration is shown in FIG. 1B. In a preferred embodiment, organic and/or inorganic materials can be removed from the bed of $C_xS$ by contact with a liquid solvent, which is shown being passed via line 36 into zone 26. Since the concentration of organic and/or inorganic materials in the liquid solvent is less than that present on the $C_xS$, they are desorbed or displaced by extraction into said solvent.

The particular liquid solvent employed is not critical and can range broadly depending upon the adsorbed species. Suitable liquid solvents for removing organics include branched hydrocarbons, linear hydrocarbons, cyclic hydrocarbons, aromatic hydrocarbons or mixtures thereof. Generally, it is preferred that the hydrocarbon solvent be non-polar. It is also preferred that the liquid solvent be able to readily solubilize the adorbate while being only weakly adsorbed onto the $C_xS$; i.e., having a low adsortivity (i.e., low binding energy) on the $C_xS$ adsorbent. By way of illustration, a comparison of various hydrocarbon solvents is presented in Table 1 below, which is excerpted from N. N. Avgull and A. V. Kieselev, Chapter 1, in *Chemistry and Physics of Carbon*, Vol. 6, edited by P. L. Walker, Jr., Marcel Decker, pp 39-42, 1970, the disclosure of which is incorporated herein by reference.

Table 1

| Hydrocarbon Solvent | Heat of Adsorption, kcal/mole |
|---|---|
| 2,2 dimethylbutane | 8.0 |
| cyclohexane | 8.7 |
| n-hexane | 10.4 |
| benzene | 9.8+ |

From Table 1, it can be seen that while aromatic hydrocarbons, cyclic hydrocarbons (e.g. cycloparaffins) and linear hydrocarbons (e.g. linear paraffins) can be employed as the hydrocarbon solvent, branched hydrocarbons are the most preferred solvent since they have the lowest adsorptivity on carbon. By branched hydrocarbon is meant a hydrocarbon having at least one tri-substituted carbon atom, at least one tetra-substituted carbon atom, or mixtures thereof. By tri-substituted carbon atom is meant a carbon atom that is bonded to three other carbon atoms, e.g., For example, in the case of heptanes, heptanes having tri-substituted carbon atoms include 2-methylhexane; 3-methylhexane; 2,3-dimethylpentane, 2,4-dimethylpentane and 3-ethylpentane. Similarly, a tetra-substituted carbon atom is a carbon atom that is bonded to four other carbons, e.g., Heptanes having tetra-substituted carbon atoms include 2,2-dimethylpentane and 3,3-dimethylpentane. The heptane 2,2,3-trimethylbutane contains both tri-substituted and tetra-substituted carbon atoms. Branched hydrocarbons having at least one tetra-substituted carbon atom are preferred.

Only a portion of the branched hydrocarbon solvent molecule need be branchy in order to practice the present invention. For example, hydrocarbons of the form RX where R is a branchy group and X is a non-branchy group can be suitably employed. Thus, hydrocarbon solvents such as tert-butyl benzene can be suitably employed. The liquid solvent may also contain other than carbon-hydrogen bonds. By way of illustration, branched hydrocarbon solvents containing oxygen, sulfur and nitrogen can also be suitably employed in the present invention. Examples of such branched hydrocarbons include di-isopropyl ether, di-t-butyl ether and t-butyl amine. Among hydrocarbon solvents containing oxygen, sulfur or nitrogen groups, the preferred solvents are those having the branched hydrocarbon group immediately adjacent to the oxygen, sulfur or nitrogen atom (for example t-butyl amine). Thus, it is clear that the branched hydrocarbon solvent employed herein may be selected from a wide variety of hydrocarbons and is limited only in that it must contain at least one tri-substituted carbon atom, at least one tetra-substituted carbon atom or mixtures thereof.

It is desired that the liquid solvents employed to desorb inorganic materials be polar liquids. Thus, suitable hydrocarbon derivatives such as alcohols, and non-hydrocarbon solvents such as water and other aqueous solutions which have significantly increased solubility for the adsorbed species can be used to desorb the inorganics. The manner in which the solubility for the adsorbate is increased will vary with the particular species adsorbed. For example, the solubility may be affected by merely changing the pH of the solution, adding one or more complexing agents (e.g., ethylenediaminetetraacetic acid). and the like.

It is also preferred that the liquid solvent have a molecular weight such that the desorbed materials can be readily separated therefrom by stripping or distillation. Also, it is preferred that the solvent have a normal boiling point at a temperature significantly higher or significantly lower (e.g. about 30° F. or more) than the normal boiling range of the desorbed species.

Regeneration via solvent extraction should be effected under conditions such that the solvent will be maintained in substantially the liquid phase. This will, of course, depend on the boiling point of the particular solvent at the regeneration pressure employed as well as various economic considerations. Typically, the regeneration via solvent extraction should be effected at temperatures ranging from about 70° to about 700° F., preferably from about 100° to about 500° F. However, if the heat of adsorption of the solvent is lower than the heat of adsorption of the adsorbate, higher temperatures (within the ranges given above) will tend to increase the effectiveness of the solvent in displacing the adsorbate. The pressure during regeneration is not critical and will normally vary between about 0 and 200 psig, preferably between 0 and 50 psig. The contact or residence time required need only be that sufficient to regenerate the $C_xS$, i.e. to obtain $C_xS$ that possesses a greater capacity to adsorb dissolved organic and/or inorganic materials from liquids than that possessed by the spent $C_xS$. Thus, the contact time may vary from a few minutes to 2 hours or more. Typically, it will range from 5 to about 30 minutes.

Solvent plus desorbed contaminants are then removed from the zone 26 via line 38 and passed into a separation zone 40 (say a fractionation zone) wherein said solvent is recovered overhead in line 42 and the desorbed contaminants recovered in line 44, assuming the solvent boils at a lower temperature than the impurities.

If desired, solvent remaining on the $C_xS$ adsorbent after regeneration via solvent extraction may be removed therefrom by stripping with a vapor introduced into zone 26 via line 46. Suitable stripping vapors include steam, light hydrocarbon gas ($C_1$–$C_4$), inert gas (e.g. nitrogen), alcohols and the like. Steam is a preferred stripping vapor. The stripping can be done at temperatures ranging from about 70° to about 1200° F., preferably from about 300° to about 700° F.

Organic materials may also be removed from the $C_xS$ by direct contact with a stripping gas entering zone 26 via line 46. In this embodiment, said materials (e.g. contaminants) are stripped from the $C_xS$ and passed via line 38 into separation zone 40 wherein the stripping gas and the impurities are separated from one another. If desired, the stripping gas can be recycled to the regeneration zone via line 46.

Preferably the stripping gas will have a normal boiling point below that of the adsorbate to facilitate separation of the stripping gas therefrom. It is also preferred that the stripping gas be inexpensive, stable during regeneration and non-reactive with the $C_xS$ or the materials of construction. Suitable stripping vapors include those noted above as well as vaporized hydrocarbon solvent.

Regeneration via stripping should be effected at the stripping temperatures given above. As with regeneration via solvent extraction, higher temperatures (within the ranges given above) will tend to increase the effectiveness of the stripping gas in removing the adsorbate if the heat of adsorption of said stripping gas is lower than that of the adsorbate. The pressure during regeneration is not critical and will normally vary within the ranges given for solvent extraction. Similarly, the contact or residence time required need only be that sufficient to regenerate the $C_xS$. Thus, the contact time may vary from 1 minute to 2 hours or more. Typically, it will range from 1 to about 15 minutes.

Organic materials can also be removed from spent $C_xS$ thermally, i.e. by heating to an elevated temperature. The particular temperature employed is not critical and will vary with a variety of process and economic factors such as the binding energy of the adsorbate on the $C_xS$, the rate of desorption and the like. However, the temperatures should be maintained below 1300° F. to avoid any deleterious effects on the $C_xS$. Preferably, the temperature will range between about 70° and about 1200° F., more preferably between about 150° to about 700° F. Pressures and contact times will vary within the ranges given above for regeneration via stripping.

It is preferred that thermal regeneration be carried out in the absence of oxidizing agents (e.g. oxygen) to avoid oxidation of the sulfur in the $C_xS$. It is also preferred that thermal regeneration be effected in the absence of reducing agents (e.g. hydrogen) to avoid reducing the sulfur. However, oxygen can be employed at temperatures below about 500° F. while hydrogen can be employed at temperatures below about 400° F. However, should a carrier gas be employed to supply heat during thermal regeneration, the use of an inert gas (such as nitrogen) is preferred, the gas entering zone 26 via line 46. The organic materials thus removed from the $C_xS$ can then be passed from zone 26 via line 38 and may be recovered by, say, condensation. This result differs from that obtained with conventional thermal regeneration processes wherein the temperature conditions employed (typically 900° to 1000° C.) result in destruction, or partial destruction, of the adsorbate.

Thus, an added benefit of regenerating the adsorbent according to any of the three methods described herein is that the adsorbate can be recovered as a by-product stream. As such, each of the regeneration methods can be employed to produce a concentrated stream of materials that were present initially in the liquid (e.g. the waste water) in only dilute concentrations. In addition, the lower temperatures required to desorb the adsorbate from $C_xS$ relative to those employed for conventional activated carbons (due to the lower binding energy of the adsorbate thereon) facilitates recovery of the adsorbate and benefits the overall economics of the process.

The present invention can be carried out in any apparatus suitable for adsorbing dissolved materials from liquids. Equipment most suitable for a specific application is beyond the scope of the present invention and can be selected by one skilled in the art. Similarly, suitable materials of construction for adsorption processes would also be known to one skilled in the art.

An alternate embodiment of the present invention for treating waste waters is shown in FIG. 2. Portions of FIG. 2 are very similar to and perform essentially the same function as described in FIG. 1. Thus, this embodiment will be described more briefly. In FIG. 2, the raw waste water is passed through line 110 into a pretreatment zone 112. A coagulant may be added to the waste water via line 114, if desired. The pretreated waste water is then passed via line 120 into storage tank 122. Thereafter, the pretreated waste water is passed via line 124 into the upper portion of contacting zone 126 wherein there is maintained a bed 128 of conventional activated carbon and a bed 130 of granular $C_xS$, the bed of $C_xS$ being placed upstream of the bed of activated carbon. In this particular embodiment, the bed of $C_xS$ acts as a guard chamber to remove those contaminants (e.g., aromatic hydrocarbons) that are adsorbed more strongly on conventional activated carbon. This will enable easier regeneration of the conventional carbon by the techniques described above. Thus, this dual adsorbent approach should enable the regeneration of both the $C_xS$ and conventional activated carbon at lower temperatures than would be required in the absence of the $C_xS$ bed.

This invention will be further understood by reference to the following examples which are not intended to unduly restrict the limits of the claims appended hereto.

Examples 1–7 show that $C_xS$ will adsorb a wide variety of organic materials from water and from organic liquids.

EXAMPLE 1

Equilibrium Isotherms for Phenol Adsorption from Water

Equilibrium isotherms for removal of phenol from water by adsorption on various carbons were measured at room temperature (about 75° F.) for model waste waters formed from distilled water and containing from between 10 and 10,000 wppm phenol initially. The carbons used as adsorbents in this experiment are listed in Table 2 below along with their surface area as measured by the BET test and pore volume as determined by measuring the desorption isotherms of nitrogen at 77° K. and using numerical relationships developed by B. R. Roberts, *J. Colloid Interface Sci.*, Vol. 23, p. 266 (1957), the disclosure of which is incorporated herein by reference. The particle size ranged between about 50 microns and 2 mm.

Table 2

|  | x in $C_xS$ | Surface Area $m^2/g$ | Total Pore Vol., cc/g |
|---|---|---|---|
| $C_xS$ Compounds From |  |  |  |
| Sucrose | 6.2 | 616 | 0.29 |
| Polyvinylidene difluoride (PVDF) | 8.4 | 808 | 0.47 |
| Conventional Carbons |  |  |  |
| Filtrasorb 300 | — | 923 | 0.51 |
| Activated Petroleum Fluid Coke | — | 500 | 0.23 |

Figure 3:
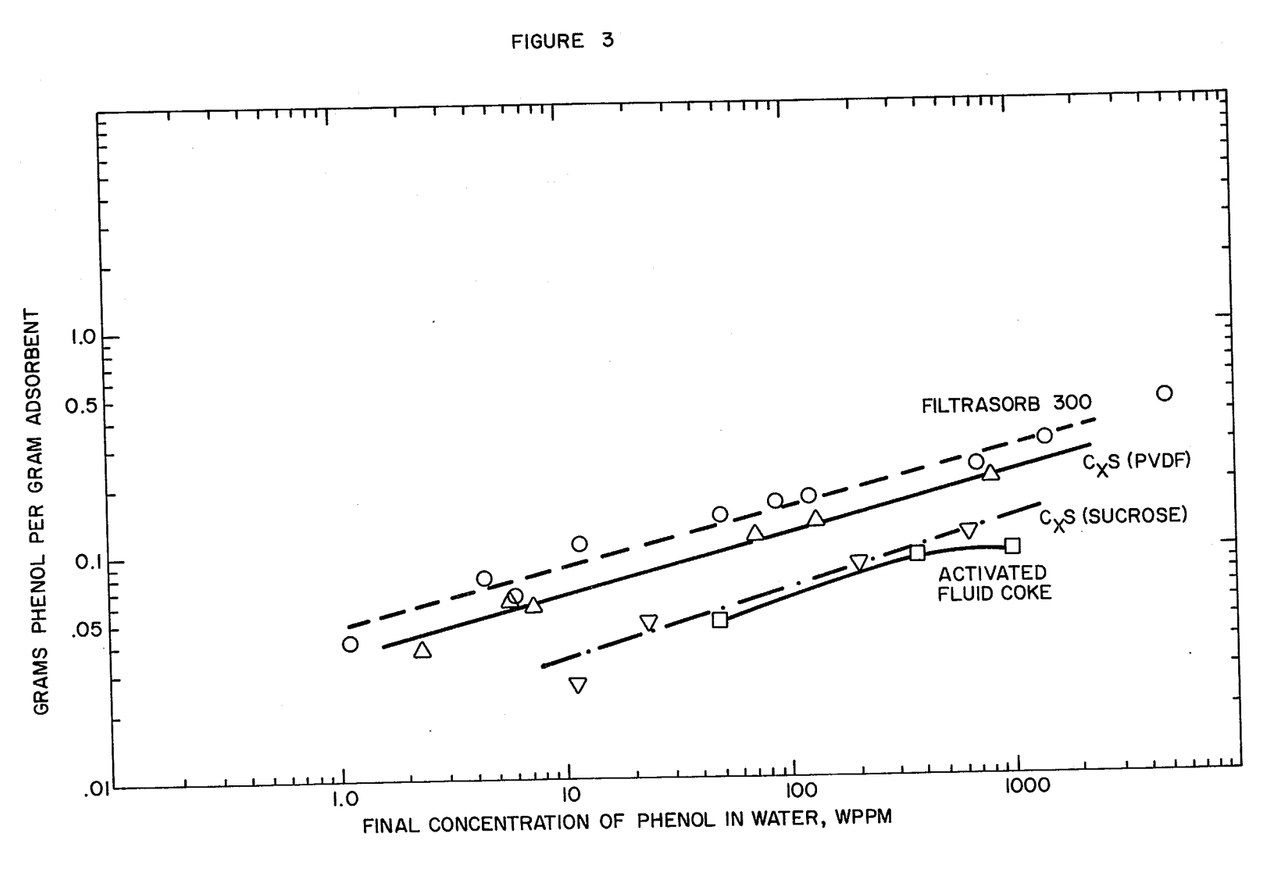
FIG. 3 illustrates equilibrium isotherms for phenol adsorption from water.

The isotherms were obtained by shaking the model waste water with the carbons for 5 days to ensure equilibrium, and measuring the amount of phenol removed therefrom using either a Perkin Elmer 900 gas chromatograph with a Porapak Q column or a JY-3 spectrofluorometer. The results of these experiments are shown in FIG. 3.

This example shows that phenol is adsorbed most strongly on Filtrasorb 300 and least strongly on activated petroleum fluid coke. The poorer adsorption on the coke is believed due in part to its low pore volume and low surface area. Phenol adsorption on the two $C_xS$ adsorbents tested is intermediate, that on $C_xS$ (PVDF) being stronger than on $C_xS$ (Sucrose).

EXAMPLE 2

Equilibrium Isotherms for Naphthalene Adsorption from Water

Figure 4:
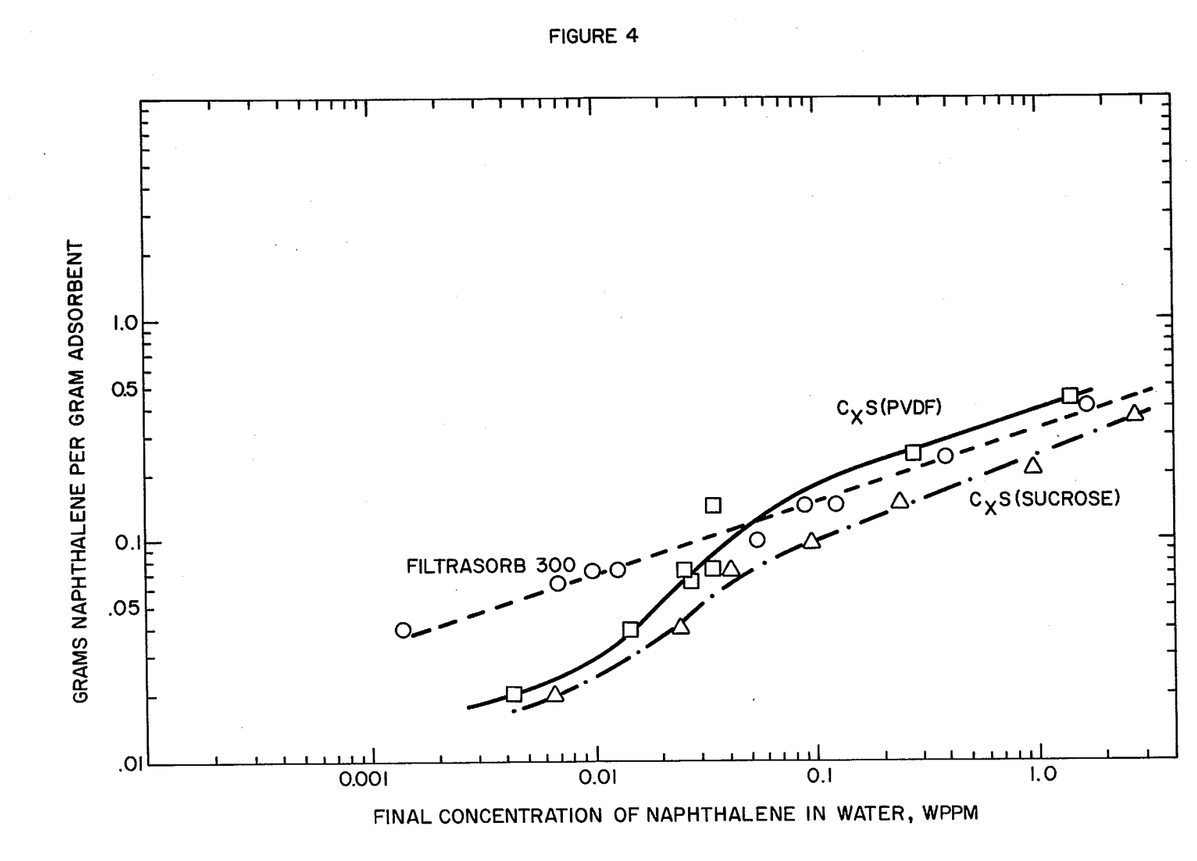
FIG. 4 illustrates equilibrium isotherms for naphthalene adsorption from water.

Following the procedure of Example 1, equilibrium isotherms were measured (using a JY-3 spectrofluorometer) for naphthalene removal from a model waste water formed from distilled water and from between 10 wppb and 10 wppm naphthalene initially. Filtrasorb 300, $C_xS$ (sucrose) and $C_xS$ (PVDF) were used as adsorbents in this experiment. The results are shown in FIG. 4.

This example shows that $C_xS$ (PVDF) has a higher capacity for naphthalene adsorption than Filtrasorb 300 at higher concentrations.

EXAMPLE 3

Equilibrium Isotherms for Ethylbenzoate Adsorption from Water

Figure 5:
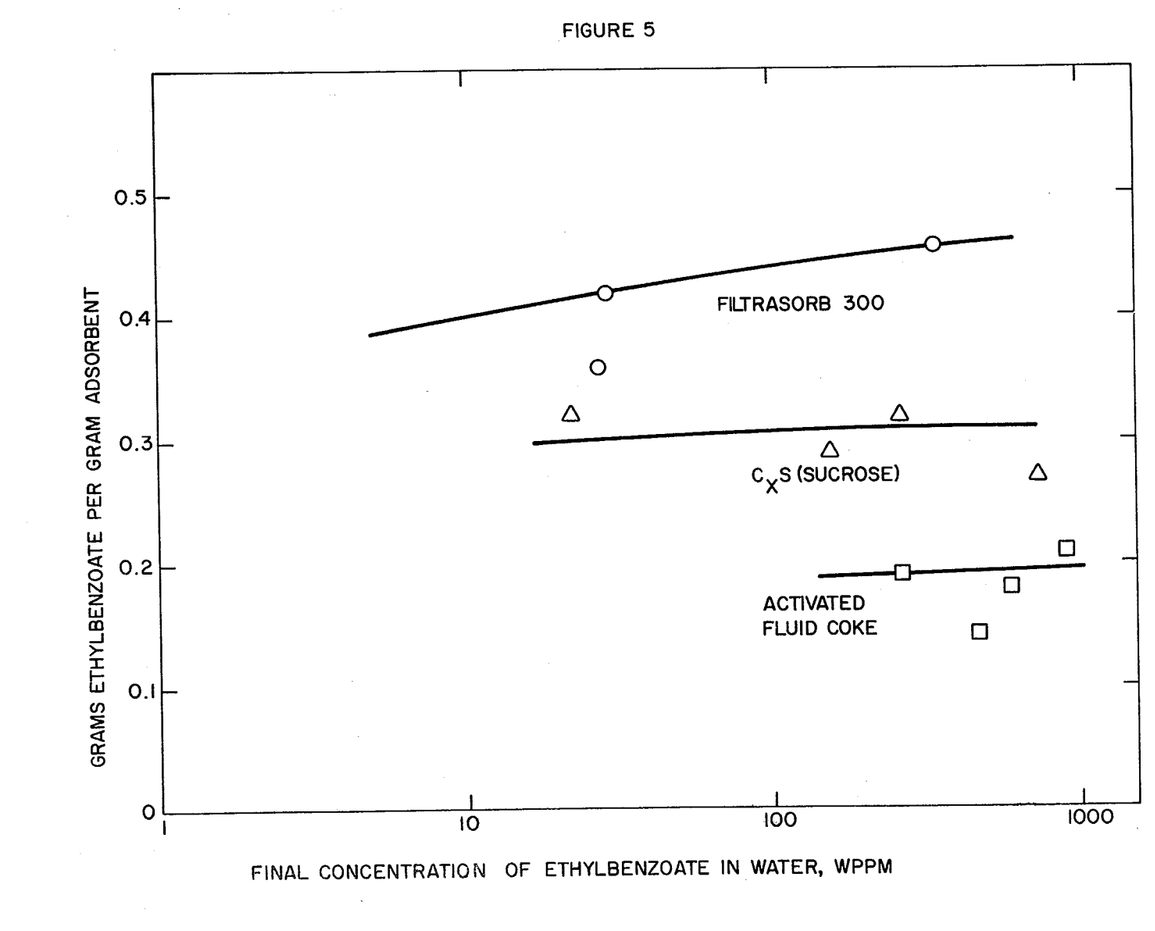
FIG. 5 illustrates equilibrium isotherms for ethylbenzoate adsorption from water.

Following the procedure of Example 1, equilibrium isotherms were measured (using gas chromatography) for ethylbenzoate removal from a model waste water formed from distilled water and from between 10 and 10,000 wppm ethylbenzoate initially. Filtrasorb 300, $C_xS$ (Sucrose) and activated fluid coke were used as adsorbents in this experiment. The results are shown in FIG. 5.

This example shows that adsorption of ethylbenzoate on $C_xS$ (Sucrose)—like adsorption of phenol shown in FIG. 3—is intermediate between Filtrasorb 300 and activated petroleum fluid coke. However, a comparison of FIGS. 3 and 5 indicates that the shape of isotherms in FIG. 5 is more strongly favorable for adsorption, reflecting the lower ethylbenzoate solubility in water and the higher molecular weight of ethylbenzoate.

EXAMPLE 4

Equilibrium Isotherms for Naphthalene Adsorption from 2,2,4-Trimethylpentane

Figure 6:
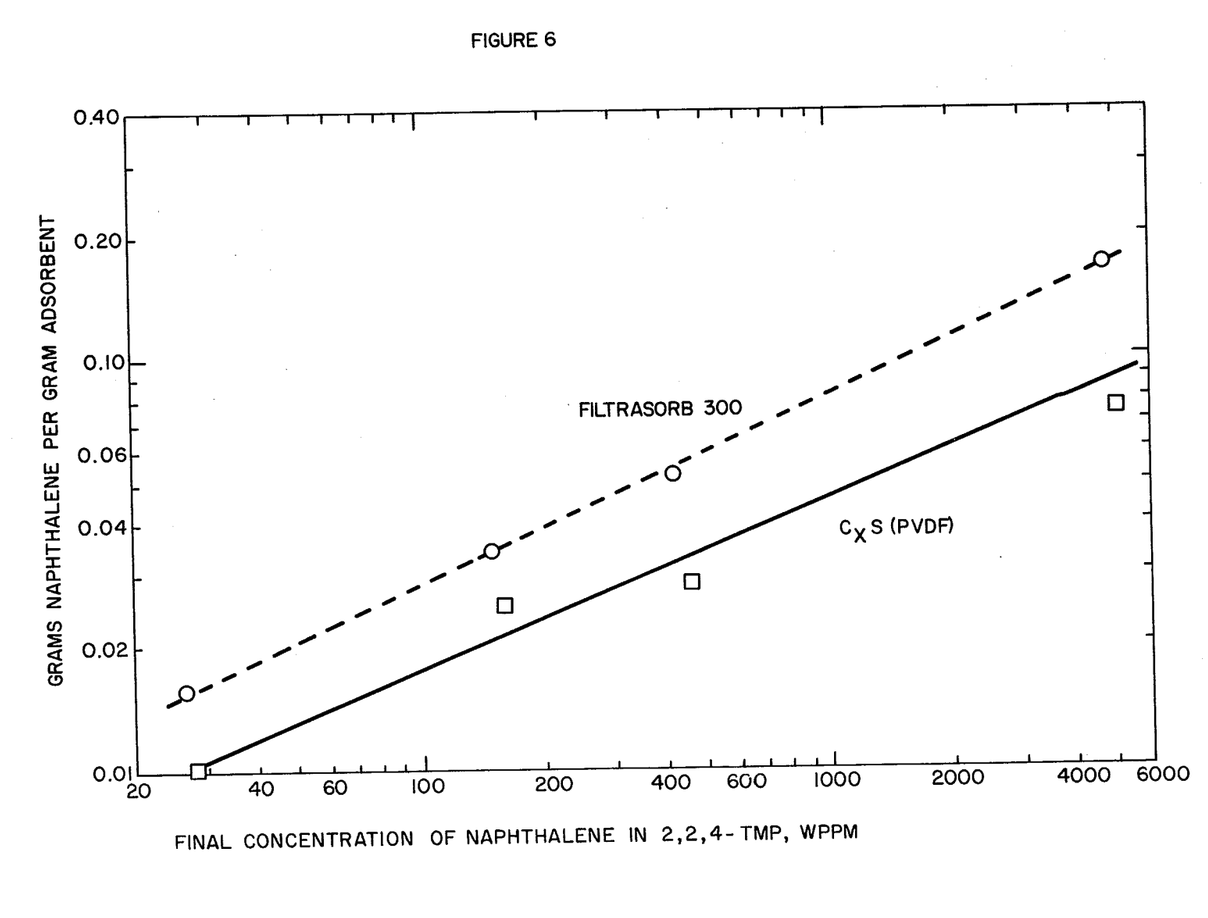
FIG. 6 illustrates equilibrium isotherms for naphthalene adsorption from 2,2,4-trimethylpentane.

Following the procedure of Example 1, equilibrium isotherms were measured (using the JY-3 spectrofluorometer) for naphthalene removal from 2,2,4-trimethylpentane (2,2,4-TMP). Filtrasorb 300 and $C_xS$ (PVDF) were used as adsorbents in this experiment with the initial naphthalene concentration ranging from 20 wppm to 5000 wppm. The results are shown in FIG. 6.

This example shows that naphthalene is more strongly adsorbed on Filtrasorb 300 than on $C_xS$. In addition, a comparison of FIGS. 4 and 6 indicates that $C_xS$ (PVDF) has a higher capacity than Filtrasorb 300 for the removal of the adsorbate from water. Also the adsorbed naphthalene can be removed more easily from $C_xS$ (PVDF) than Filtrasorb 300 by the branched hydrocarbon, 2,2,4-trimethylpentane.

EXAMPLE 5

Equilibrium Isotherms for n-butylbenzene Adsorption from Organic Liquids

Figure 7:
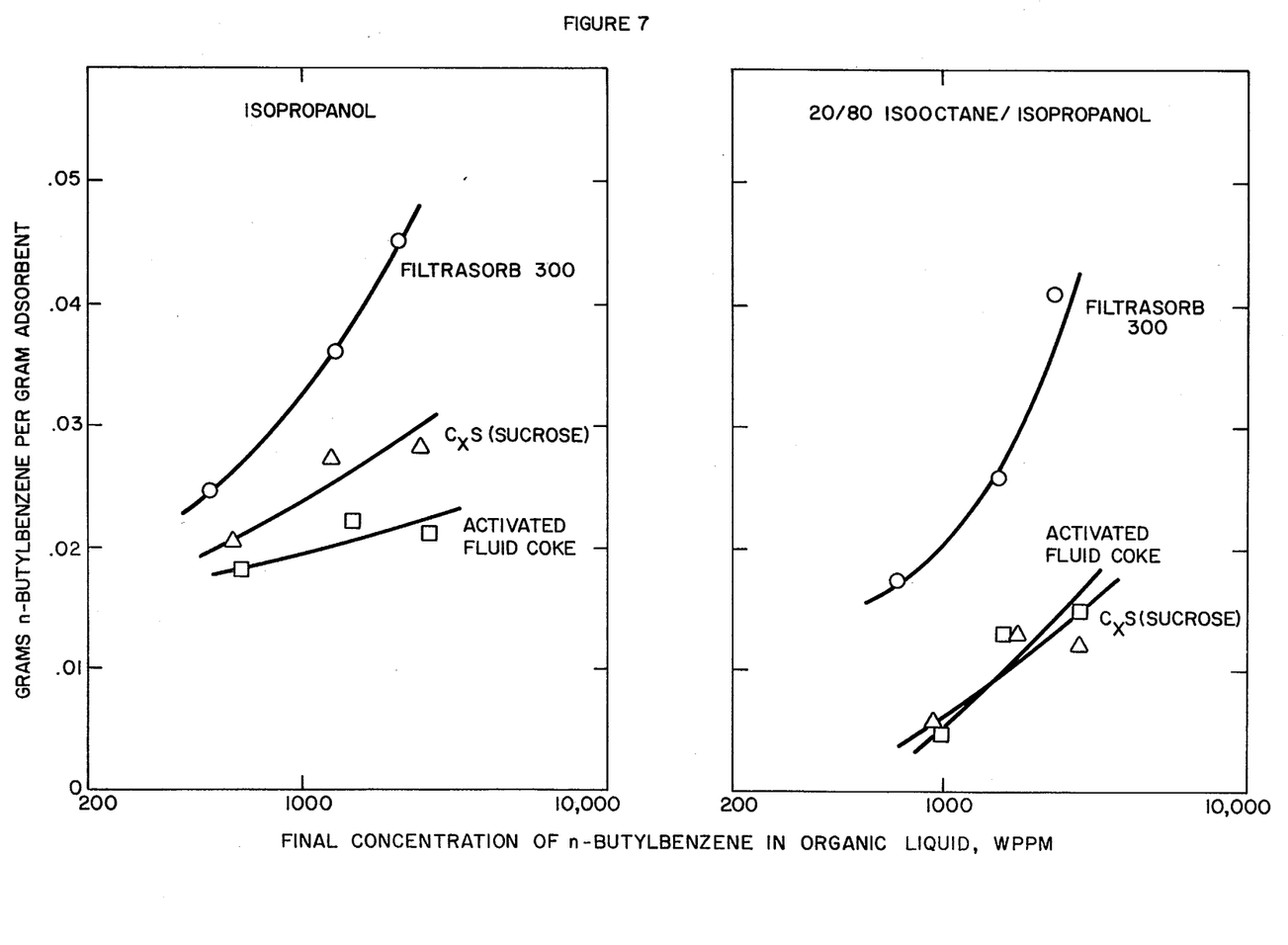
FIG. 7 illustrates n-butylbenzene adsorption from organic liquids.

Following the procedure of Example 1, adsorptions of n-butylbenzene from isopropanol and from a 20/80 blend of isooctane and isopropanol were measured using gas chromatography. The results are shown in FIG. 7.

This experiment shows that n-butylbenzene adsorption is suppressed when adsorption is from the 20/80 blend of isooctane and isopropanol, the less polar liquid.

EXAMPLE 6

Equilibrium Isotherms for Phenol and Acetophenone Adsorption from Organic Liquids Following the procedure of Example 1, adsorption of phenol and acetophenone from isopropanol and a 20/80 blend of isooctane and isopropanol were measured using gas chromatography. Based on these results, the capacity ratio for both phenol and acetophenone was calculated. By capacity ratio is meant the ratio of $C_xS$ (Sucrose) capacity to Filtrasorb 300 capacity for the same adsorbate at the same concentration in the solvent. The results of this experiment are presented in Table 3. Capacity ratio for phenol adsorption from water (Example 1) and from an ethylene glycol/water mixture is also included. The solubility parameters, $\delta$, for each of the solvents (which is a measure of their polarity as well as an indication of their affinity for aromatics) is also included in Table 3. A discussion of solvent parameter may be found in *Kirk-Othmer Encyclopedia of Chemical Technology*, 2nd Ed. Supplement Volume, pp. 889–910, Interscience Publishers, 1971.

Table 3

| Solvent | $\delta$ | Capacity Ratio Phenol | Capacity Ratio Acetophenone | Surface Area Ratio of the Adsorbents |
|---|---|---|---|---|
| Water | 23.5 | 0.62 | — | 0.67 |
| Ethylene Glycol/$H_2O$ | 20 | 0.86 | — | 0.67 |
| Isopropanol | 11.5 | 0.82 | 1.1 | 0.67 |
| Isooctane/Isopropanol | 10.6 | 0.29 | 1.1 | 0.67 |

Table 3 shows that for phenol adsorption from the more polar solvents (larger value of $\delta$), the capacity ratio is approximately equal to the surface area ratio for the two adsorbents. However, the capacity ratio is lower for adsorption from less polar solvents which suggests that $C_xS$ can be regenerated more easily with solvents having a lower solubility parameter. For acetophenone, the capacity ratio is much higher than the area ratio of the two adsorbents, indicating an unusually high capacity of $C_xS$ for acetophenone.

Examples 7–11 show that $C_xS$ will adsorb inorganic ions from aqueous solutions:

EXAMPLE 7

Adsorption of Lead, Uranium and Chromium Ions from an Aqueous Solution

Experiments were conducted to compare the removal of lead, uranium and chromium ions from an aqueous solution using $C_xS$ (PVDF) and Nuchar WV-L, the latter having a surface area of 985 square meters per gram and a pore volume of 0.63 cubic centimeters per gram. This was done by shaking the adsorbents and the metal ion-containing solution for 5 days and then measuring the metal ion reductions by x-ray fluorescence using a Phillips PW 1220C semi-automatic vacuum spectrograph. The results thus obtained are shown in Table 4.

Table 4

| Metal Ion | Metal Salt | Initial Metal Ion Concentration (wppm) | % Metal Ion Reduction By $C_xS$ | % Metal Ion Reduction By Nuchar |
|---|---|---|---|---|
| $Pb^{++}$ | $Pb(NO_3)_2$ | 100 | 93 | 100 |
| $UO_2^{++}$ | $UO_2(NO_3)_2$ | 1000 | 4 | 98 |
| $CrO_4^{--}/Cr_2O_7^{--}$ | $Na_2Cr_2O_7$ | 1000 | 8 | 48 |

EXAMPLE 8

Adsorption of Mercury Ion from an Aqueous Solution

Following the procedure of Example 7, the removal of mercury ion from an aqueous solution was measured using $C_xS$ (PVDF) and Nuchar WV-L. For a mercury ion solution of 100 wppm prepared from mercuric nitrate, the metal ion reductions were measured to be 100% for $C_xS$ and 93% for Nuchar.

EXAMPLE 9

Adsorption of Group 1B Metal Ions from an Aqueous Solution

Following the procedure of Example 7, the removal of copper, silver and gold ions from an aqueous solution were measured using $C_xS$ (PVDF) and Nuchar WV-L. The results obtained are shown in Table 5.

Table 5

| Metal Ion | Metal Salt | Initial Metal Ion Concentration (wppm) | % Metal Ion Reduction By $C_xS$ | % Metal Ion Reduction By Nuchar |
|---|---|---|---|---|
| $Cu^{++}$ | $CuSO_4$ | 100 | 67 | 95 |
| $Ag^+$ | $AgNO_3$ | 100 | 88 | 100 |
| | | 1000 | 64 | 58 |
| $Au^{+++}$ | $HAuCl_4$ | 100 | 100 | 100 |

EXAMPLE 10

Adsorption of a Mixture of Gold and Silver Ions from Aqueous Solutions

Following the procedure of Example 7, the removal of a mixture of gold and silver ions from aqueous solutions was measured using $C_xS$ (PVDF) and Nuchar WV-L. The results thus obtained are shown in Table 6.

Table 6

| Solution | Initial Metal Ion Concentration (wppm) | % Metal Ion Reduction By $C_xS$ | % Metal Ion Reduction By Nuchar |
|---|---|---|---|
| $HAuCl_4$ | 500 (Au) | 100 (Au) | 100 (Au) |
| $+AgNO_3$ | 500 (Ag) | 60 (Ag) | 56 (Ag) |
| $HAuCl_4$ | 260 (Au) | 72 (Au) | 99.5 (Au) |
| $+AgNO_3$ $+NaCN$ (excess) (ph = 11.5) | 360 (Ag) | 23 (Ag) | 30 (Ag) |

EXAMPLE 11

Adsorption of $UO_2(CO_3)_3^{-4}$ from an Aqueous Carbonate Solution

Following the procedure of Example 7, the removal of $UO_2(CO_3)_3^{-4}$ from an aqueous solution was measured using $C_xS$ (PVDF) and Nuchar WL-L. The results obtained are shown in Table 7.

Table 7

| Metal Salt in Solution | Initial Metal Ion Concentration (wppm) | % Metal Ion Reduction By $C_xS$ | % Metal Ion Reduction By Nuchar |
|---|---|---|---|
| $UO_2(NO_3)_2$ + $K_2CO_3$(excess) | 100 | 22 | 22 |
| $UO_2(NO_3)_2$ + $K_2CO_3$(excess) | 200 | 11 | 12 |
| $UO_2(NO_3)_2$ + $K_2CO_3$(excess) | 1000 | ~0 | ~0 |

Examples 7, 8, 9 and 10 indicate that the $C_xS$ samples tested showed, in general, slightly lower adsorption than conventional Nuchar for $Cu^{++}$, $Ag^+$, $Pb^{++}$, $UO_2^{++}$ and $CrO_4^{--}/Cr_2O_7^{--}$. Also, adsorption of $Au^{+++}$ and $Hg^{++}$ was at least as good on $C_xS$ as on Nuchar—both adsorbents appearing to give nearly complete removal of both of these metal ions from aqueous solutions. $C_xS$ appeared to be slightly better than Nuchar for $Hg^{++}$ removal.

Example 11 indicates that $C_xS$ shows a very slight capacity (about 0.1 wt. %) for $UO_2(CO_3)_3^{-4}$ adsorption at low concentration (less than 100 wppm) in carbonate solution, whereas the conventional carbon failed to adsorb the uranium.

Examples 12 and 13 show that $C_xS$ loaded with organics can be desorbed by extraction with a solvent:

EXAMPLE 12

Naphthalene Desorption by 2,2,4-trimethylpentane

Figure 8:
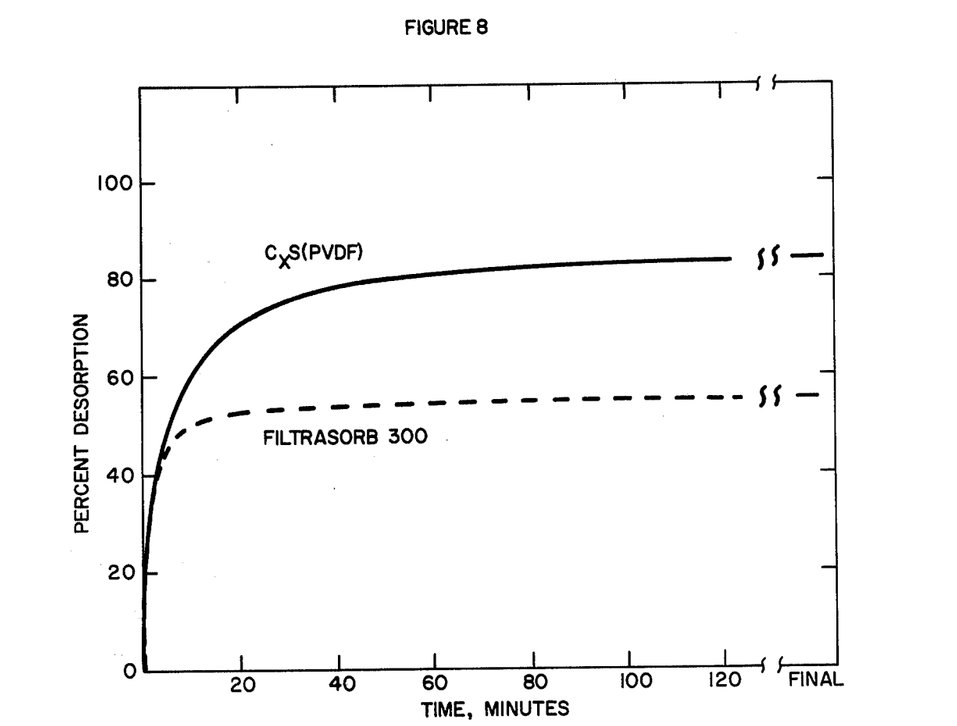
FIG. 8 illustrates desorption of naphthalene by 2,2,4-trimethylpentane.

Naphthalene desorptions from adsorbents by solvent extraction were measured at 30° C. Spent adsorbent loaded with naphthalene was thoroughly mixed with 150 cc of 2,2,4-trimethylpentane and the concentration of naphthalene in the solvent was continuously monitored by a JY-3 spectrofluorometer through a micro flow-through cell. Filtrasorb 300 (61 mg) and $C_xS$ (PVDF) (49.3 mg) with the same naphthalene loading were studied in this experiment. The results are shown in FIG. 8.

The desorption curves show that naphthalene can be desorbed more completely from $C_xS$ (PVDF) than from Filtrasorb 300 by 2,2,4-trimethylpentane. The kinetics of desorption is fast for both absorbents.

EXAMPLE 13

Phenol Desorption by Isopropanol

Figure 9:
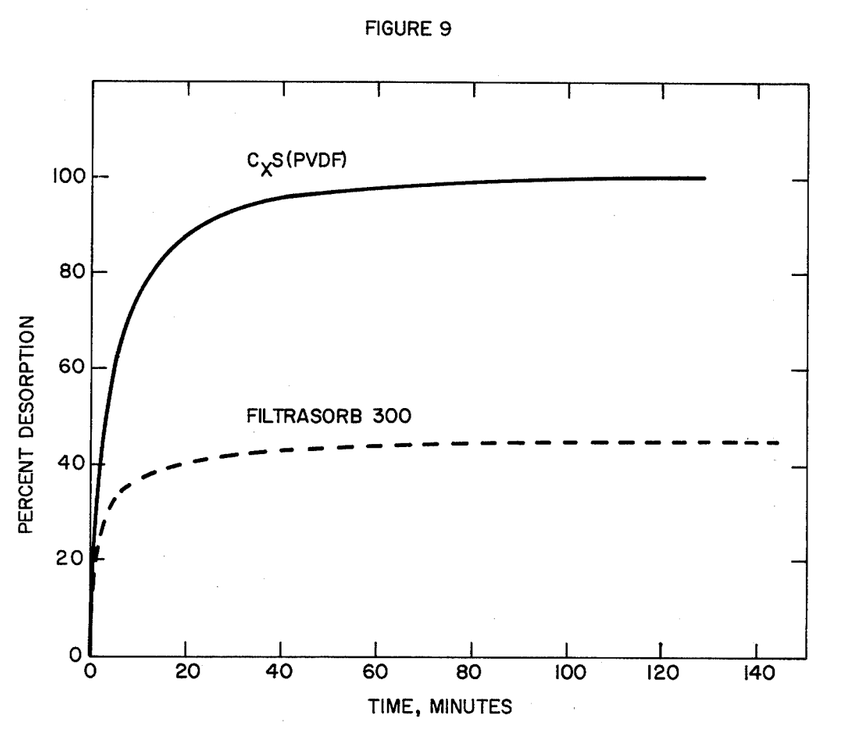
FIG. 9 illustrates desorption of phenol by isopropanol.

Following the procedure of Example 12, desorptions of phenol from 20.1 mg of $C_xS$ (PVDF) and 19.6 mg Filtrasorb 300 by 150 cc of isopropanol were measured at 29° C. The results are shown in FIG. 9.

The desorption curves show that phenol can be desorbed more completely from $C_xS$ (PVDF) than from Filtrasorb 300.

Example 14 shows that $C_xS$ loaded with inorganics can be desorbed with a liquid solvent:

EXAMPLE 14

Desorption of Gold and Silver Ions with Aqueous Sodium Cyanide Solution

The desorptions of $Au^{+++}$ and $Ag^+$ from $C_xS$ (PVDF) and Nuchar WV-L were studied by shaking the loaded adsorbent with NaCN/water solution at room temperature and measuring the metal ion concentrations in the solution by x-ray fluorescence. Results are shown in Table 8.

This experiment indicates that gold was removed (desorbed) more readily from $C_xS$ than from conventional carbon. Silver desorption occurred easily from both adsorbents.

Table 8

| Metals on Aborbent | Desorbent | Metal Ion Conc. in Desorbent, wppm from $C_xS$ | from Nuchar | % Metal Desorbed from $C_xS$ | from Nuchar |
|---|---|---|---|---|---|
| Au, Ag | Aq. NaCN | 39 (Au) | 23 (Au) | ~ 13 (Au) | ~ 5 (Au) |
| | | 187 (Ag) | 176 (Ag) | ~ 90 + (Ag) | ~ 90 + (Ag) |

What is claimed is:

1. A process for removing dissolved organic materials, dissolved inorganic materials or mixtures thereof from a liquid which comprises contacting said liquid with a nonstoichiometric carbon-sulfur compound of the formula $C_xS$, where x ranges from 4 to about 50, said compound having a surface area of at least 300 square meters per gram, for a period of time sufficient to adsorb at least a portion of said dissolved materials from said liquid.

2. The process of claim 1 wherein x ranges from 4 to about 10.

3. The process of claim 1 wherein the $C_xS$ has a surface area ranging between 300 and about 2500 square meters per gram and a pore volume of at least 0.2 cubic centimeters per gram.

4. The process of claim 1 wherein said liquid is polar.

5. The process of claim 1 wherein said dissolved inorganic materials are selected from the group consisting of metal ions, metalloid ions, cyanides, thiocyanates and mixtures thereof.

6. The process of claim 1 wherein said dissolved organic materials are selected from the group consisting of aromatic hydrocarbons, phenolic hydrocarbons, halogenated hydrocarbons, nitrated hydrocarbons and mixtures thereof.

7. The process of claim 1 wherein said liquid is non-aqueous.

8. The process of claim 7 wherein said non-aqueous liquid is a hydrocarbon.

9. The process of claim 7 wherein said liquid is polar.

10. The process of claim 1 wherein said liquid, after contacting said nonstoichiometric carbon-sulfur compound, contacts a bed of activated carbon.

11. The process of claim 1 wherein the adsorption of said dissolved materials causes a reduction in the adsorptive capacity of said nonstoichiometric carbon-sulfur compounds, said compounds being regenerated by removing at least a portion of said adsorbed materials from said compounds.

12. The process of claim 1 wherein the $C_xS$ compound is regenerated by removing at least a portion of the dissolved materials adsorbed by the $C_xS$ compound.

13. The process of claim 12 wherein x ranges from about 4 to about 10.

14. The process of claim 12 wherein the $C_xS$ has a surface area ranging between 300 and 2500 square meters per gram and a pore volume of at least 0.2 cubic centimeters per gram.

15. The process of claim 12 wherein said removal is effected by contacting said nonstoichiometric carbon-sulfur compound with a stripping gas for a period of time sufficient to remove at least a portion of said dissolved materials from said compound.

16. The process of claim 15 wherein said stripping gas is selected from the group consisting of steam, inert gas, alcohols and mixtures thereof.

17. The process of claim 16 wherein said stripping gas comprises steam.

18. The process of claim 12 wherein said removal is effected by heating said compound at a temperature between about 70° and about 1200° F. for a period of time sufficient to remove at least a portion of said materials from said nonstoichiometric carbon-sulfur compound.

19. The process of claim 18 wherein said compound is heated at a temperature between 150° and 700° F.

20. The process of claim 18 wherein an inert gas is used as a heat carrier.

21. The process of claim 1 wherein the $C_xS$ compound is regenerated by contacting the $C_xS$ compound with a liquid solvent for a period of time sufficient to remove at least a portion of dissolved materials absorbed by the $C_xS$ compound.

22. The process of claim 21 wherein said liquid solvent is a hydrocarbon.

23. The process of claim 22 wherein said liquid solvent is a branched hydrocarbon having at least one tri-substituted carbon atom, at least one tetra-substituted carbon atom or mixtures thereof.

24. The process of claim 23 wherein said liquid solvent is a hydrocarbon having at least one tetra-substituted carbon atom.

25. The process of claim 21 wherein said liquid solvent comprises water.

26. The process of claim 21 wherein the temperature during said contacting ranges from about 70° to about 700° F.

27. The process of claim 26 wherein the temperature during said contacting ranges from about 100° to about 500° F.

28. The process of claim 21 wherein the nonstoichiometric carbon-sulfur compound is contacted with a stripping gas after contact with said liquid solvent.

29. The process of claim 28 wherein said stripping gas is steam.

30. The process of claim 21 wherein the dissolved materials removed from said nonstoichiometric carbon-sulfur compound are recovered from said liquid solvent.

31. A process for removing dissolved organic materials, dissolved inorganic materials or mixtures thereof from an aqueous liquid which comprises contacting said liquid with a nonstoichiometric carbon-sulfur compound of the formula $C_xS$ where x ranges from 4 to about 50, said compound having a surface area of at least 300 square meters per gram for a period of time sufficient to adsorb at least a portion of said dissolved materials from said liquid.

32. The process of claim 31 wherein x ranges from about 4 to about 10.

33. The process of claim 31 wherein said carbon-sulfur compound has a surface area ranging between 300 and about 2500 square meters per gram and a pore volume of at least 0.2 cubic centimeters per gram.

34. The process of claim 31 wherein said dissolved organic materials are selected from the group consisting of aromatic hydrocarbons, phenolic hydrocarbons, halogenated hydrocarbons, nitrated hydrocarbons and mixtures thereof.

35. The process of claim 34 wherein said dissolved organic materials comprise an aromatic hydrocarbon.

36. The process of claim 31 wherein said dissolved inorganic materials are selected from the group consisting of metal ions, metalloid ions, cyanides, thiocyanates and mixtures thereof.

37. The process of claim 36 wherein said dissolved inorganic materials comprise metal ions.

38. A process for removing dissolved organic materials, dissolved inorganic materials or mixtures thereof from a liquid which comprises
    (a) contacting said liquid with a nonstoichiometric carbon-sulfur compound of the formula $C_xS$, where x ranges from 4 to about 50, said compound having a surface area of at least 300 square meters per gram, for a period of time sufficient to adsorb at least a portion of said dissolved materials from said liquid onto said compound, thereby reducing the adsorptive capacity of said compound,
    (b) regenerating said nonstoichiometric carbon-sulfur compound by removing at least a portion of said dissolved materials from said compound.

39. The process of claim 38 wherein x ranges from 4 to about 10.

40. The process of claim 38 wherein the $C_xS$ has a surface area ranging from 300 to about 2500 square meters per gram and a pore volume of at least 0.2 cubic centimeters per gram.

41. The process of claim 38 wherein said regeneration is effected by contacting said compound with a liquid solvent for a period of time sufficient to remove at least a portion of said dissolved materials therefrom.

42. The process of claim 41 wherein said dissolved organic materials are selected from the group consisting of aromatic hydrocarbons, phenolic hydrocarbons, halogenated hydrocarbons, nitrated hydrocarbons and mixtures thereof.

43. The process of claim 42 wherein said liquid solvent is a hydrocarbon.

44. The process of claim 41 wherein said dissolved inorganic materials are selected from the group consisting of metal ions, metalloid ions, cyanides, thiocyanates and mixtures thereof.

45. The process of claim 44 wherein said liquid solvent comprises water.

* * * * *